US012771652B2

(12) United States Patent
Xiang et al.

(10) Patent No.: US 12,771,652 B2
(45) Date of Patent: Oct. 20, 2026

(54) DATA DELIVERY MANAGEMENT ACROSS A PLURALITY OF CHANNELS

(71) Applicant: Beijing Youzhuju Network Technology Co., Ltd., Beijing (CN)

(72) Inventors: Min Xiang, Beijing (CN); Yumin Su, Beijing (CN); Yifei Chen, Beijing (CN); Yasong Li, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/813,963

(22) Filed: Aug. 23, 2024

(65) Prior Publication Data

US 2024/0414097 A1 Dec. 12, 2024

(51) Int. Cl.
*H04L 47/76* (2022.01)
*H04L 47/80* (2022.01)

(52) U.S. Cl.
CPC ............ *H04L 47/76* (2013.01); *H04L 47/801* (2013.01)

(58) Field of Classification Search
CPC ......... H04W 28/0958; H04W 28/0967; H04W 28/0983; H04W 28/0942
See application file for complete search history.

(56) References Cited

U.S. PATENT DOCUMENTS 6,377,554 B1 * 4/2002 Farnsworth ........ H04Q 11/0457 370/468
6,463,468 B1 10/2002 Buch et al.
8,687,499 B2 * 4/2014 Senarath ................ H04B 7/155 370/395.2
9,059,817 B2 * 6/2015 Huang .................. H04L 1/0009
9,294,406 B2 * 3/2016 Liou ........................ H04L 45/42
10,050,760 B2 * 8/2018 Ross ........................ H04W 4/44
(Continued)

FOREIGN PATENT DOCUMENTS

CN 1737835 A 2/2006
CN 104737132 A 6/2015
(Continued)

OTHER PUBLICATIONS

International Search Report received for PCT Patent Application No. PCT/CN2025/091569, mailed on Aug. 6, 2025, 3 pages.
International Search Report received for PCT Patent Application No. PCT/CN2025/091588, mailed on Jul. 21, 2025, 3 pages.
International Search Report received for PCT Patent Application No. PCT/CN2025/091589, mailed on Aug. 13, 2025, 3 pages.
(Continued)

*Primary Examiner* — Alex Tran

(57) ABSTRACT

There are provided methods, devices, and computer program products for managing data delivery across a plurality of channels. In the method, delivery performance across the plurality of channels is obtained. A plurality of resource costs for the data delivery across the plurality of channels are determined based on the delivery performance and a plurality of predetermined models. The plurality of predetermined models are corresponding to the plurality of channels respectively, and with respect to a target channel in the plurality of channels, a target predetermined model represents an association relationship between a resource cost for data delivery on the target channel and a delivery performance of data delivery on the target channel. The delivery performance is updated based on a sum of the plurality of resource costs and a resource cost constraint associated with the data delivery across the plurality of channels.

20 Claims, 8 Drawing Sheets

(56) References Cited

U.S. PATENT DOCUMENTS

| | | | |
|---|---|---|---|
| 10,952,222 | B1 | 3/2021 | Wires et al. |
| 11,488,205 | B1 | 11/2022 | Hou et al. |
| 11,818,050 | B2 * | 11/2023 | Detwiler ............... H04M 15/81 |
| 12,335,136 | B2 * | 6/2025 | Rahman .................. H04L 45/28 |
| 12,375,359 | B2 * | 7/2025 | Wang .................. H04L 41/0826 |
| 12,445,894 | B2 * | 10/2025 | Jia ..................... H04W 28/0242 |
| 2003/0172165 | A1 | 9/2003 | Xu et al. |
| 2008/0022301 | A1 | 1/2008 | Aloizos |
| 2010/0191600 | A1 | 7/2010 | Sideman |
| 2013/0117062 | A1 | 5/2013 | Rangarajan et al. |
| 2014/0129391 | A1 | 5/2014 | Kreuels et al. |
| 2016/0328273 | A1 | 11/2016 | Molka et al. |
| 2018/0005314 | A1 | 1/2018 | Li et al. |
| 2020/0322073 | A1 * | 10/2020 | Chen ................... H04L 43/0888 |
| 2021/0084313 | A1 * | 3/2021 | Nguyen .................... G06T 5/70 |
| 2021/0150609 | A1 | 5/2021 | Ma et al. |
| 2021/0367621 | A1 * | 11/2021 | Sandoval ................ H04L 47/50 |
| 2023/0103048 | A1 | 3/2023 | Eberstein |
| 2023/0259874 | A1 | 8/2023 | Mcalister et al. |
| 2023/0289560 | A1 | 9/2023 | Li et al. |
| 2023/0327982 | A1 | 10/2023 | Rahman |
| 2023/0419368 | A1 | 12/2023 | Maalej et al. |
| 2024/0281723 | A1 | 8/2024 | Kaleem et al. |
| 2024/0420193 | A1 | 12/2024 | Xiang et al. |
| 2024/0422109 | A1 | 12/2024 | Li et al. |
| 2024/0422235 | A1 | 12/2024 | Okuno et al. |

FOREIGN PATENT DOCUMENTS

| | | | |
|---|---|---|---|
| CN | 109003140 | A | 12/2018 |
| CN | 109040206 | A | 12/2018 |
| CN | 111275226 | A | 6/2020 |
| CN | 114092125 | A | 2/2022 |
| CN | 114581114 | A | 6/2022 |
| CN | 114707936 | A | 7/2022 |
| CN | 115204922 | A | 10/2022 |
| WO | 2011/153007 | A2 | 12/2011 |
| WO | 2018/055506 | A1 | 3/2018 |

OTHER PUBLICATIONS

Kim, et al., "Online banner advertisement scheduling for advertising effectiveness" Computers & Industrial Engineering, vol. 140, Feb. 2020, 106226, 12 Pages, https://doi.org/10.1016/j.cie.2019.106226 (Year: 2020).

Non-Final Office Action mailed on Aug. 28, 2025, for U.S. Appl. No. 18/814,001, pp. 18.

Non-Final Office Action mailed on Dec. 23, 2015, for U.S. Appl. No. 18/813,930, pp. 39.

Final Office Action mailed on Apr. 10, 2026, for U.S. Appl. No. 18/813,930, pp. 33.

Non-Final Office Action mailed on Aug. 21, 2026, for U.S. Appl. No. 18/813,930, pp. 9.

* cited by examiner

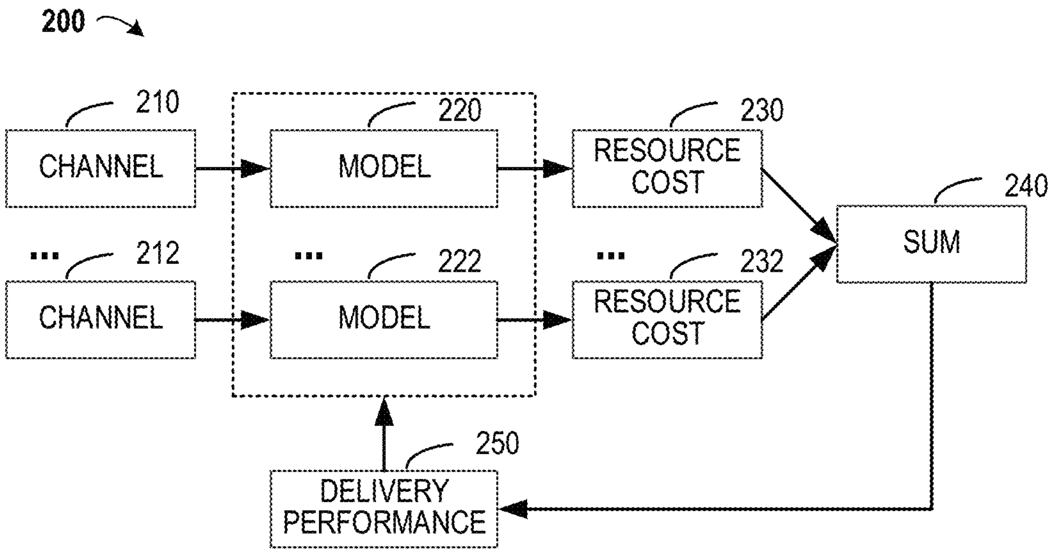

*FIG. 2*

300

Algorithm 1 SPB Framework

Input: target ROI $R_{target}$, spend cap $S_{cap}$ set by advertiser
Output: optimal $b_{l+1}$ for next time control interval $t_{l+1}$ // Macro Spend Planning

1: Input the target ROI $R_{target}$ and spend cap $S_{cap}$, work out at the total optimal spend $S^{(opt)}$ for a spending period 2: Obtain the optimal spend $S_{l+1}^{(opt)}$ for the next time interval $t_{l+1}$ // Micro Bidding Optimization

3: Construct an interpolation queue with the point pairs $(S_l^{(opt)}, b_l)$ and obtain $b_{l+1}$ through interpolation or extension methods

*FIG. 3*

500

Algorithm 2 Interpolation-based MPC method

Input: $(P_{S_l}, R_{thr_l})$ for time control interval $t_l$;
$Q = queue(P_{S_i}, R_{thr_i}), i \in \{1, \ldots, L\}$ for last $L$ time control intervals
$V = vector(S_{ratio_j})$ for remain time control intervals from budget allocation methods
$S^{(opt)}$ the expected spend in a spending period derived from the macro stage
$S_{cap}$ maximum spend in a spending period set by advertiser
$P_S$ cumulative spend in a spending period
Output: $b_{l+1}$ for next time control interval $t_{l+1}$ if $P_S > S_{cap}$ then
  $b_{l+1} = 0$
  return
else
  if $len(Q) == 0$ then
    $b_{l+1} = init(constant\_bid)$
    return
  else
    $lastR_{thr} = R_{thr_l}$
  end if
  // *deal with new data*
  if $valid(P_{S_l}, R_{thr_l})$ then
    $Q = push(Q, (P_{S_l}, R_{thr_l}))$
  else
    $b_{l+1} = F(lastR_{thr})$ // using Eq. (6)
    return
  end if
  if $len(Q) > L$ then
    $Q = pop(Q)$
  end if
  // *calculate the expected spend for* $t_{l+1}$
  $S^{(opt)}_{l+1} = (S^{(opt)} - P_S) \cdot S_{ratio_{l+1}} / \sum_j S_{ratio_j}$
  // *aggregate and average points with similar* $R_{thr}$ *values*

$AQ = aggregation(Q)$
  // *calculate new* $R_{thr}$ *with liner interpolation*
  $LISQ = LongestIncreasingSubSquence(AQ)$
  $(P_{S_{x_1}}, R_{thr_{x_1}}), (P_{S_{x_2}}, R_{thr_{x_2}}) = ClosestPoint(LISQ, S^{(opt)}_{l+1})$
  $R_{thr_{l+1}} = R_{thr_{x_1}} + (S^{(opt)}_{l+1} - P_{S_{x_1}}) \cdot \frac{R_{thr_{x_2}} - R_{thr_{x_1}}}{P_{S_{x_2}} - P_{S_{x_1}}}$
  $b_{l+1} = F(R_{thr_{l+1}})$ // using Eq. (6)
  return
end if

*FIG. 5*

600

Algorithm 3 Multi Channel SPB - *macro stage*

Input: $R_{target}, R_{target_{channel_j}}, S_{cap}, S_{floor_{channel_j}}$
Output: $S_{channel_j}$ initialize:$S^{(opt)} = 0, P_G = 0$,random($R_{thr}$)
repeat
  for each channel $j$ do
    $S_{channel_j} = \max(F_{channel_j}(R_{thr}), S_{floor_{channel_j}})$ // using Eq. 9 and Eq. 10 and Eq. 1
    $R_{res_{channel_j}} = F(S_{channel_j})$ // using Eq. 12
    $P_{G_{channel_j}} = F(R_{res_{channel_j}})$ // using Eq. 11
    $S^{(opt)} += S_{channel_j}, P_G += P_{G_{channel_j}}$
  end for
  $R_{res} = \frac{P_G}{S^{(opt)}}$
  if $R_{res} < R_{target}$ or $S^{(opt)} > S_{cap}$ or $R_{res_{channel_j}} < R_{target_{channel_j}} for \forall j$ then
    Explore up $R_{thr}$ in $(R_{thr}, +\infty)$
  else
    Explore down $R_{thr}$ in $(0, R_{thr})$
  end if
until $R_{thr}$ convergence
$S_{channel_j} = F_{channel_j}(R_{thr})$ // using Eq. 9

*FIG. 6*

700

| Dataset | # Campaigns | Avg. $wp/spend$ | $g_i$ |
|---|---|---|---|
| SKAN | 455 | $2.82 \times 10^{-7}$ | 7% each |
| PCM | 4488 | $1.24 \times 10^{-6}$ | 7% each |
| non-privacy | 1290 | $6.28 \times 10^{-7}$ | 7% each |

*FIG. 7*

900

Algorithm 4 Multi Channel Promotion (calculate margin_cpa by bisection until the range of margin_cpa converges).

```
total cost=0
total convert=0
i=0
for i < the number of channels
    cost=function1(margin_cpa)
    cost=constraint_i(cost)
    convert=function2(cost)
    total cost+=cost
    total convert+=convert
total cpa= total cost /total convert
if (total cpa > cpa constraint) or (total cost > cost constraint)
    explore down (margin_cpa) by bisection
else:
    explore up(margin_cpa) by bisection
```

*FIG. 9*

DATA DELIVERY MANAGEMENT ACROSS A PLURALITY OF CHANNELS

FIELD

The present disclosure generally relates to data delivery management, and more specifically, to methods, devices and computer program products for managing data delivery across a plurality of channels.

BACKGROUND

Data providers search for potential consumers to promote their data with a clear Return-On-Investment (ROI) demand and a limited spend. In the data delivery field, Real-Time Bidding (RTB) allows data providers to bid on a display data impression in real time. Here, the data delivery is also referred to as delivery, content delivery, content placement, data placement, data publication and the like. To support data providers in achieving their objectives, a multitude of identity-revealing bidding algorithms have been developed. Typically, these algorithms generate bids based on real-time feedback gathered from user behavior event sequences, such as impressions, clicks, and conversions. However, the reliance of real-time and precise user data has become increasingly controversial, triggering widespread concerns about data protection. At this point, it is expected to guarantee the effect of data delivery and protect user data at the same time.

SUMMARY

In a first aspect of the present disclosure, there is provided a method for managing data delivery across a plurality of channels. In the method, delivery performance for data delivery across the plurality of channels is obtained. A plurality of resource costs for the data delivery across the plurality of channels are determined based on the delivery performance and a plurality of predetermined models. The plurality of predetermined models are corresponding to the plurality of channels respectively, and with respect to a target channel in the plurality of channels, a target predetermined model in the plurality of predetermined models that corresponds to the target channel represents an association relationship between a resource cost for data delivery on the target channel and a delivery performance of data delivery on the target channel. The delivery performance is represented by the resource cost and a delivery purpose caused by the resource cost. The delivery performance is updated based on a sum of the plurality of resource costs and a resource cost constraint associated with the data delivery across the plurality of channels.

In a second aspect of the present disclosure, there is provided an electronic device. The electronic device comprises: a computer processor coupled to a computer-readable memory unit, the memory unit comprising instructions that when executed by the computer processor implements a method according to the first aspect of the present disclosure.

In a third aspect of the present disclosure, there is provided a computer program product, the computer program product comprising a computer readable storage medium having program instructions embodied therewith, the program instructions executable by an electronic device to cause the electronic device to perform a method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

Through the more detailed description of some implementations of the present disclosure in the accompanying drawings, the above and other objects, features and advantages of the present disclosure will become more apparent, wherein the same reference generally refers to the same components in the implementations of the present disclosure.

FIG. 2 illustrates an example diagram of managing data delivery across a plurality of channels according to implementations of the present disclosure;

FIG. 3 illustrates an example diagram of a framework of data delivery management according to implementations of the present disclosure;

FIG. 5 illustrates an example diagram of an interpolation algorithm according to implementations of the present disclosure;

FIG. 6 illustrates an example diagram of an algorithm of multi-channel promotion according to implementations of the present disclosure;

FIG. 7 illustrates an example diagram of an industrial dataset according to implementations of the present disclosure;

FIG. 9 illustrates an example diagram of a multi-channel promotion algorithm according to implementations of the present disclosure;

DETAILED DESCRIPTION

Figure 1:
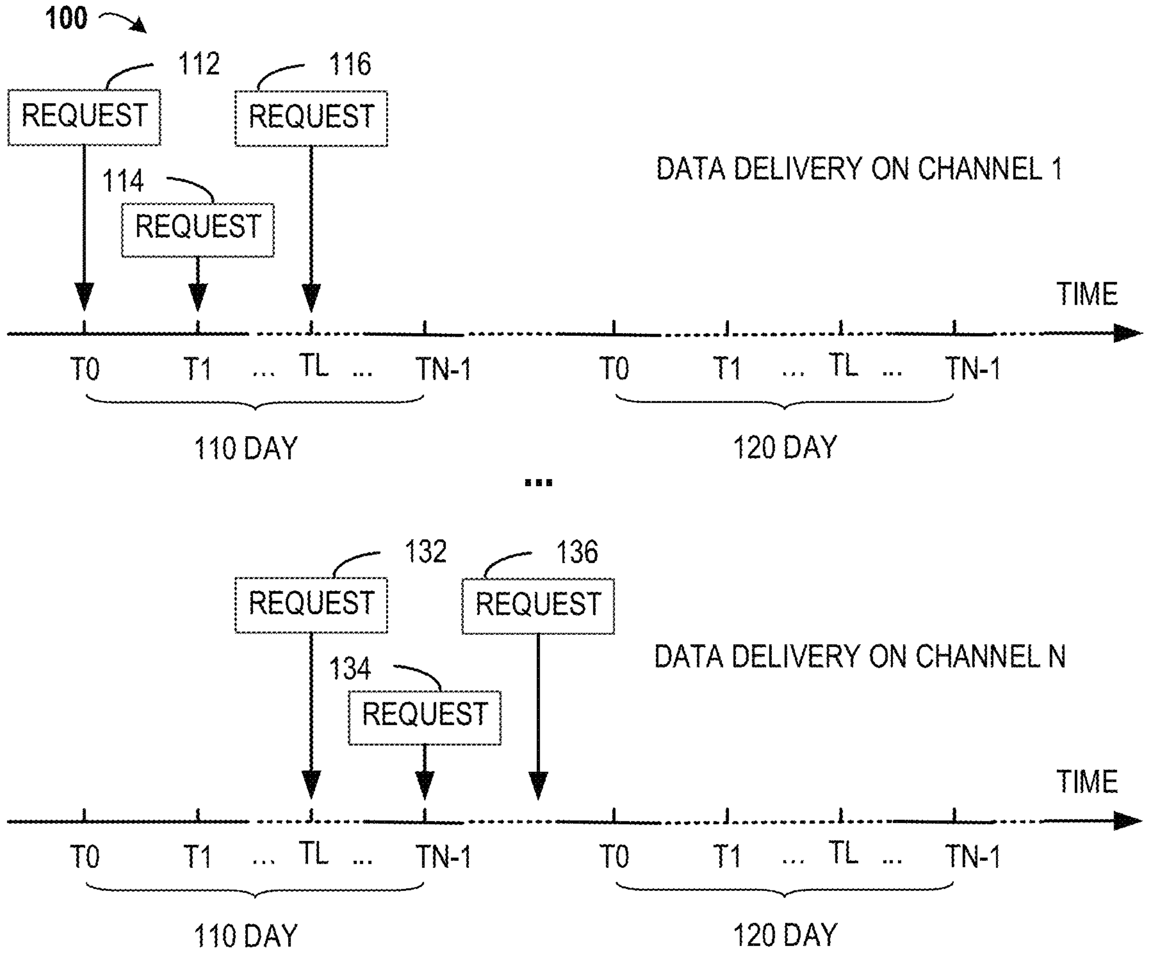
FIG. 1 illustrates an example environment for managing data delivery across a plurality of channels according to implementations of the present disclosure.

Principle of the present disclosure will now be described with reference to some implementations. It is to be understood that these implementations are described only for the purpose of illustration and help those skilled in the art to understand and implement the present disclosure, without suggesting any limitation as to the scope of the disclosure. The disclosure described herein may be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one implementation," "an implementation," "an example implementation," and the like indicate that the implementation described may include a particular feature, structure, or characteristic, but it is not necessary that every implementation includes the particular feature, structure, or characteristic. Moreover, such phrases are not necessarily referring to the same implementation. Further, when a particular feature, structure, or characteristic is described in connection with an example implementation, it is submitted that it is within the knowledge of one skilled in the art to affect such feature, structure, or characteristic in connection with other implementations whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example implementations. As used herein, the term "and/or" includes any and all combinations of one or more of the listed terms.

The terminology used herein is for the purpose of describing particular implementations only and is not intended to be limiting of example implementations. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Principle of the present disclosure will now be described with reference to some implementations. It is to be understood that these implementations are described only for the purpose of illustration and help those skilled in the art to understand and implement the present disclosure, without suggesting any limitation as to the scope of the disclosure. The disclosure described herein may be implemented in various manners other than the ones described below. In the following description and claims, unless defined otherwise, all technical and scientific terms used herein have the same meaning as commonly understood by one of ordinary skills in the art to which this disclosure belongs.

It may be understood that data involved in the present technical solution (including but not limited to the data itself, the acquisition or use of the data) should comply with requirements of corresponding laws and regulations and relevant rules.

It may be understood that, before using the technical solutions disclosed in various implementation of the present disclosure, the user should be informed of the type, scope of use, and use scenario of the personal information involved in the present disclosure in an appropriate manner in accordance with relevant laws and regulations, and the user's authorization should be obtained.

For example, in response to receiving an active request from the user, prompt information is sent to the user to explicitly inform the user that the requested operation will need to acquire and use the user's personal information. Therefore, the user may independently choose, according to the prompt information, whether to provide the personal information to software or hardware such as electronic devices, applications, servers, or storage media that perform operations of the technical solutions of the present disclosure.

As an optional but non-limiting implementation, in response to receiving an active request from the user, the way of sending prompt information to the user, for example, may include a pop-up window, and the prompt information may be presented in the form of text in the pop-up window. In addition, the pop-up window may also carry a selection control for the user to choose "agree" or "disagree" to provide the personal information to the electronic device.

It may be understood that the above process of notifying and obtaining the user authorization is only illustrative and does not limit the implementation of the present disclosure. Other methods that satisfy relevant laws and regulations are also applicable to the implementation of the present disclosure.

As briefly mentioned above, identity-revealing bidding algorithms depend on user data, which triggers widespread concerns about the data security (such as privacy and the like). In response to the rising controversial, regulatory agencies and companies have formulated a series of policies to protect user data security by making user data untraceable. As a result, display data becomes far less effective under data security regulation and non-data driven performance optimization is hard.

A more sensitive equilibrium in the data delivery field is expected and some companies have proposed corresponding policies. For example, some strategies are proposed to help data providers measure the success of data delivery while maintaining user data security. However, these coping strategies still impact the data delivery in two major aspects. Firstly, event aggregation makes it impossible to attribute conversion event to a single user click, but only to a cohort of users based on certain aggregation rules. Therefore, bidding algorithms may no longer leverage fine-grained and real-time ROI data. Secondly, reporting delay involves intentionally delaying conversion reports by 24 to 48 hours. This delay may cause bidding strategies to respond sluggishly. Moreover, random factors are typically introduced during this delay period to mitigate data security compromises from timing attacks.

Existing research usually focuses on improving traditional identity-revealing methods which only address a fraction of the problem and are greatly affected by data security constraints.

For the reporting delay challenge, most solutions are proposed in the field of Conversion Rate (CVR) prediction model. Some related works proposes a non-parametric delayed feedback model to estimate the time delay. Some related works directly quantizes conversions into multiple windows as a multi-head model. However, considering the large and stochastic delay of conversions caused by data security policies, it is difficult to ensure the estimated stability.

The application of the widely used Proportion Integration Differentiation (PID) in data security scenarios is also extremely limited due to its heavily rely on real-time conversion feedback. Another type of classic method in the online advertising industry is Model Predictive Control (MPC) which models the relation between bid, spend and conversion with fine-grained auction replay data to predict the optimal bid, thereby suffering from the conversion delay and inaccuracy problems arising from strict data security regulation.

Reinforced Learning-based (RL) solutions attempt to optimize delivery performance by using bidding or spending control through a learned policy or agent. However, considering the lack of real time and fine-grained interactive feedback with the environment, applying these methods in data security scenarios is almost ineffective.

In practical data delivery scenarios, the same data provider may deliver data in different channels and at different time. The resource allocation and results of different channels may be different. However, setting a separate p resource allocation for each channel is time consuming and it cannot guarantee the optimal result of each channel. When the data is delivered across multiple channels, the situation becomes more complex.

The issue of managing data delivery across a plurality of channels will be described with reference to FIG. 1, which illustrates an example environment 100 for managing data delivery across a plurality of channels according to implementations of the present disclosure. In the environment 100, a data provider may display data on channel 1 to N. For example, the data provider may submit a plurality of requests (e.g., a request 112, a request 114 and a request 116) at different time points on channel 1. In addition, the data provider may submit a plurality of requests (e.g., a request 132, a request 134 and a request 136) at different time points on channel N. It is expected to optimize the results of data delivery across a plurality of channels under a certain resource cost constraint.

In view of the above, the present disclosure proposes a solution for managing data delivery across a plurality of channels with reference to FIG. 2, which illustrates an example diagram of managing data delivery across a plurality of channels according to implementations of the present disclosure. As illustrated in FIG. 2, delivery performance 250 (such as Cost Per Action, abbreviated as CPA) for data delivery across the plurality of channels (e.g., a channel 210 and a channel 212) is obtained. A plurality of resource costs (e.g., a resource cost 230 and a resource cost 232) for the data delivery across the plurality of channels are determined based on the delivery performance 250 and a plurality of predetermined models (e.g., a model 220 and a model 222). The plurality of predetermined models are corresponding to the plurality of channels respectively, and with respect to a target channel (e.g., the channel 210) in the plurality of channels, a target predetermined model (e.g., the model 220) in the plurality of predetermined models that corresponds to the target channel represents an association relationship between a resource cost (e.g., the resource cost 230) for data delivery on the target channel (e.g., the channel 220) and a delivery performance 250 of data delivery on the target channel. The delivery performance 250 is represented by the resource cost 230 and a delivery purpose caused by the resource cost.

Then, the delivery performance 250 is updated based on a sum 240 of the plurality of resource costs and a resource cost constraint associated with the data delivery across the plurality of channels. With these implementations of the present disclosure, a same delivery performance may be generated for all channels, thereby reducing computational cost and improving the effectiveness of data delivery across a plurality of channels.

The following paragraphs will provide a working environment of the resource allocation. Taking the ROI demand of data providers and the platform ecology comprehensively into account, the problem that the present disclosure defines to solve is to maximize gross merchandise volume (GMV) with the ROI and spend constraints (i.e., the delivery purpose). Some relevant notations are defined in the following table 1 and the mathematical representation of this problem is derived by analogy to the online stochastic knapsack problem.

TABLE 1

Notation Description

| Notation | Description |
|---|---|
| $x_i$ | A binary variable with a value of {0, 1}, indicating whether the data delivery wins an $\text{auction}_i$ |
| $b_i$ | Bid price for the data delivery in $\text{auction}_i$ |
| $wp_i$ | Winning price for the data delivery in $\text{auction}_i$ |
| $c_i$ | Conversion events obtained by the data delivery after winning $\text{auction}_i$ |
| $S_{cap}$ | Maximum spend within a spending period of the data delivery set by data provider |
| $R_{target}$ | Target ROI of the data delivery set by data provider |

For a given data provider's data delivery a, suppose there are N auction opportunities in a preset spending period (e.g., a day). These opportunities are denoted according to their generated order as $\text{auction}_i$. Based on the previously stated definitions, the cumulative GMV and SPEND for the N auctions over the spending period are recognized as $P_G$ and $P_S$, respectively. This corresponds to $$P_G = \sum_{i=1}^{N} x_i \cdot c_i \cdot v_a,$$

where $v_a$ represents the value derived from a conversion event for the data provider. Consequently, the expected ROI result (hereafter abbreviated as $R_{res}$) may be obtained as follows:

$$R_{res} = \frac{P_G}{P_S} = \frac{\sum_{i=1}^{N} x_i \cdot c_i \cdot v_a}{\sum_{i=1}^{N} x_i \cdot wp_i} \tag{1}$$

For the data delivery a, the goal of the present disclosure is to maximize $P_G$ under $S_{cap}$ and $R_{target}$ constraints which is formulated as:

$$\max_{x_i} \sum_{i=1}^{N} x_i \cdot c_i \cdot v_a \tag{2}$$

s.t.

$$\sum_{i=1}^{N} x_i \cdot wp_i \le S_{cap} \tag{3}$$

$$\frac{\sum_{i=1}^{N} x_i \cdot c_i \cdot v_a}{\sum_{i=1}^{N} x_i \cdot wp_i} \ge R_{target} \tag{4}$$

The optimal bidding formula is defined from the perspective of a single $\text{auction}_i$ as:

$$b_i = \frac{c_i \cdot v_a}{r_i} \tag{5}$$

In Eq. (5), $r_i$ may be regarded as the ROI of $\text{auction}_i$. It is worth noting that the proposed problem is related to a variant of the Knapsack Problem (KP), i.e., the online stochastic variant. Each auction opportunity may be regarded as an item i with value $P_{g_i}(gmv_i)$ and weight $P_{c_i}(wp_i)$. Assuming there is a knapsack with a capacity of $S_{cap}$, the aim is to load the knapsack as much as possible to maximize its cumulative value while ensuring the expected ROI and not exceeding the capacity. However, due to the fact that bidding, winning, clicking, and conversion occur in chronological order, accurate value and weight information, i.e., $c_i$ and $wp_i$ may not be obtained in advance, respectively. Therefore, in bidding strategy, only historical conversion quantity or model estimates may be used to replace $c_i$ and $wp_i$, and an immediate decision has to be made whether to pack the item or not.

As delineated above, the problem represented by Eq. (2) are addressing becomes challenging under the constraints imposed by data security regulations for the subsequent reasons. Firstly, the value of $c_i$ in $auction_i$ does not correspond one-to-one, thereby complicating the optimization process for fine-grained estimation methods such as model-based approaches. Secondly, the reporting delay of $c_i$ exceeds 24 hours, while the frequently adopted spending period is a single day. This discrepancy implies that the regulation of real-time bidding strategies is executed without a ground truth label. Then, the value of $c_i$ is not a stationary but a noisier feedback after aggregation, making it almost impossible to estimate the distribution of $c_i$.

These data security-related challenges induce considerable and irregular variance in the estimated deviation d(t) of $c_i$. Given the impact of d(t), Eq. (5) transforms into:

$$b_i = \frac{c_i \cdot d(t) \cdot v_a}{r_i} = \frac{c_i \cdot v_a}{\frac{r_i}{d(t)}} = \frac{c_i \cdot v_a}{r_i'} \tag{6}$$

Based on Eq. (6), the applicability of three state-of-the-art methods in data security scenarios is analyzed.

Real-time feedback control $c_i$ is the observed conversion events while online bidding process usually requires to calculate the bid price $b_i$ and return it within tens of milliseconds. This notion is contradictory to the hysteresis characteristic of data security scenarios.

Model predictive control (MPC) replaces ground truth values with model-estimated click-through rates $ctr_i$ and conversion rates $cur_i$, i.e., $c_i = ctr_i * cur_i$. This reliance on model generalization may partially address the hysteresis issue. Since the historical patterns are not likely suitable for the future under the stochastic limitation and conversions cannot be precisely applied back to every fine-grained individual sample under the coarse-grained constraint, the accuracy and stability of model estimation cannot be guaranteed. Therefore, the MPC based methods has low applicability in data security scenarios.

Reinforced learning (RL) based methods demand real-time feedback to adapt bidding policies and actions which are typically model-based. As a consequence, they encounter similar obstacles as MPC methods within data security scenarios.

As analyzed above, the problem under review may be identified as an online stochastic KP in data security scenarios. The incompleteness of $c_i$ and $wp_i$ in online auctions indicates that conventional optimization solutions (for example, Dynamic Programming) are not applicable. It has been asserted that the greedy algorithm serves as a proximal optimal algorithm when the weight of the item is significantly smaller than the knapsack's capacity, i.e., $wp_i \leq (1-\lambda) S_{cap}$, $0 \leq \lambda \leq 1$ where $\lambda$ signifies the degree of resemblance to the optimal solution. As an example, in a data delivery platform, $\lambda$ is generally sizable, and thus this validates the greedy algorithm as suitable for approximately resolving the problem.

The THRESHOLD, a typical example of greedy algorithms, only packages an item i when its efficiency $value_i$/$weight_i$ (in this case $c_i \cdot v_a / \cdot wp_i = r_i$) equals or surpasses a predefined threshold $R_{thr}$, until the knapsack is filled (spend reaches cap) or there are no items (auction opportunities) left. Once $R_{thr}$ is determined, the optimal bid may be inferred by substituting $r_i$ in Eq. (5) with $R_{thr}$. The specific threshold $R_{thr}$ is identified through feedback mechanism or model learning, which is inherently limited in data security scenarios due to aggregation, hysteresis, and stochastic attributes. Contrarily, SPB algorithm (SPB Two-Stage Decomposition) proves resilient to these impediments, thereby facilitating valuable results in data security situations. In the following, the SPB framework in Algorithm 1 will be introduced and then elaborated in the following. FIG. 3 illustrates an example diagram 300 of the Algorithm 1 of data delivery management according to implementations of the present disclosure. As illustrated in FIG. 3, the inputs of Algorithm 1 are: target ROI $R_{target}$ and spend cap $S_{cap}$ set by a data provider. The output of Algorithm 1 is optimal $b_{l+1}$ for next time control interval $t_{l+1}$. To be specific, the first step is to input the target ROI $R_{target}$ and spend cap $S_{cap}$ to calculate the total optimal spend $S^{(opt)}$. The second step is to obtain the optimal spend $$S_{l+1}^{(opt)}$$

for the next time interval $t_{l+1}$. The third step is to construct an interpolation queue with the point pairs $$(S_l^{(opt)}, b_l)$$

and obtain $b_{l+1}$ through interpolation or extension methods.

The SPB algorithm offers several distinct advantages. Firstly, innovative two-stage decomposition framework for online bidding is provided. This approach effectively dampens the impact of model estimation errors. Secondly, this algorithm is applicable in data security scenarios. The application of long-term cumulated data allows for the effective management of the three challenges involved in data security scenarios: coarse-grained, hysteresis, and stochastic natures. This level of resolution is not achievable with other non-decomposition methods. Thirdly, complexity reduction is provided. The original solution space of $\chi = [x_1, \ldots, x_i, \ldots, x_N]$ is reduced from $2^N$ to a single dimension, which only necessitates the determination of $S^{(opt)}$.

The SPB algorithm consists of two stages: macro and micro. The reason why the algorithm is split in this way will be explained and further details about each stage will be provided. First, we establish a theorem based on an ideal scenario, not taking into account d(t). Then, it is extended to a more common scenario where d(t) is considered. For a short time period $t_l$, the ROI of a single auction may be defined as $r_i = P_{g_i} / P_{S_i}$. In this context, the THRESHOLD greedy algorithm in an ideal scenario works as follows. Firstly, it sorts all auction opportunities in a descending order according to $r_i$. Secondly, it selects auction opportunities from top to bottom until $r_i$ meets the optimal threshold $$R_{thr}^{(opt)}$$

and obtains corresponding bid by replacing $r_i$ in Eq. (5) with $$R_{thr}^{(opt)}.$$

Figure 4:
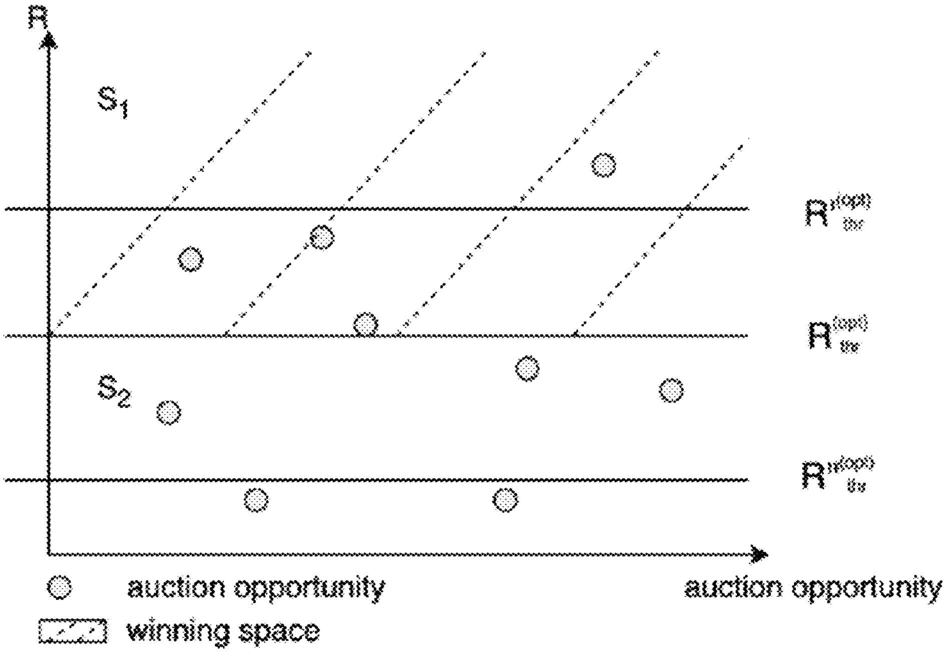
FIG. 4 illustrates an example diagram of a demonstration of the THRESHOLD algorithm according to implementations of the present disclosure.

FIG. 4 illustrates an example diagram 400 of a demonstration of the THRESHOLD algorithm according to implementations of the present disclosure. As shown in FIG. 4, all auction opportunities are won where $r_i$ is greater than or equal to $$R_{thr}^{(opt)}$$

(shadow region $S_1$ in FIG. 4) to achieve the maximization of $P_G$ under the $R_{target}$ and $S_{cap}$ constraints. Referring to Eq. (6), disregarding d(t) means that the estimated value of $c_i$ is equal to the ground-truth value. For each auction opportunity, it may be accurately placed in the corresponding position in FIG. 4. Then, a theorem, Theorem 1, is provided.

In Theorem 1, when the $R_{thr}$ remains consistent across all auction opportunities, the optimal solution is achieved. The theorem is proved by contradiction. Considering the situation of two different $R_{thr1}$ and $R_{thr2}$, assuming the overall $P_G$ is maximum with $R_{thr1}>R_{thr2}$, then we move $R_{thr1}$ down of an exiguity $$\Delta R_{thr1}^{-}$$

and move $R_{thr2}$ up of an exiguity $$\Delta R_{thr2}^{+}$$

with $$\Delta P_{S_{thr1}}^{+} = \Delta P_{S_{thr2}}^{-}.$$

Since all auction opportunities are arranged in descending order by ROI, there is $$\Delta R_{res1}^{-} > \Delta R_{res2}^{+}.$$

Given that $\Delta P_{G_{thr}}=\Delta P_{P_{sthr}}\cdot R_{res}$, it naturally follows that $$\Delta P_{G_{thr1}}^{+} > \Delta P_{G_{thr2}}^{-},$$

i.e., moving a portion of spend in $R_{thr2}$ to $R_{thr1}$ may obtain an overall $$P'_G \text{ that } P'_G > P_G,$$

which contradicts the initial assumption of $P_G$ being maximal.

Nevertheless, in data security scenarios, the value of d(t) cannot be overlooked as it precludes the attainment of real-time $c_i$ values in short time intervals. As mentioned, data security policies often impose a certain delay (e.g., SKAN does not surpass 48 hours). By aggregating data over multiple days, the actual value of $c_i$ may be closed to. d(t) does not highly fluctuate within a very short time interval. Thus, if $r_i$ is order-preserving regardless of the value of d(t) for all auction opportunities, using THRESHOLD algorithm remains a viable solution even in a short duration. This insight provides a motivation to separate the online bidding process into two stages: macro and micro. The macro stage devises the optimal spend $S^{(opt)}$, for a given spending period from archived data over a long period, and then allocates $S^{(opt)}$ for a short time interval $t_l$ following a budget allocation curve to get $$S_l^{(opt)}.$$

Subsequently, the micro stage generates the real-time bidding price based on $$S_l^{(opt)}.$$

It is crucial to note that budget distribution curve research, a field focused on optimizing budget allocation, ensures a consistent $R_{thr}$ once the allocated budget is fully spent. While this study leverages existing works to potentially optimize budget allocation efficiency.

Regarding macro spend planning, as previously stated, the macro stage devises the long-term optimal spend $S^{(opt)}$, ensuring this allocated spend aligns with the long-term optimum in Eq. (2). This problem is modeled by exploring the relationship between optimal GMV and optimal ROI, and this will be demonstrated with an example. Initially, in the absence of d(t) considerations, the following theorems are proposed under ideal conditions. A theorem, Theorem 2, is proposed. For data delivery with different $R_{target}$ and $S_{cap}$ constraints, the optimal result ROI $$R_{res}^{(opt)}$$

is monotone increasing with respect to $$R_{thr}^{(opt)}.$$

To verify the proof of the Theorem 2 more clearly and more intuitive, an illustration is shown in FIG. 4. Assuming $$R_{thr}^{(opt)}$$

is moved between $$R_{thr}^{\prime(opt)} \text{ and } R_{thr}^{\prime\prime(opt)}$$

under different $R_{target}$ and $S_{cap}$ constraints, more auction opportunities are obtained in the $S_2$ region. Since $r_i$ is arranged in descending order, any $r_i$ in the $S_1$ region is greater than any $r_j$ in the $S_2$ region, i.e. $r_i>r_j$, $\forall i\in S_1$, $j\in S_2$. Therefore, the result ROI also follows the same inequality relationship $$R_{res_{S_1}}^{(opt)} \geq R_{res_{S_2}}^{(opt)},$$

considering Eq. (1), the following equation is obtained.

$$\frac{P_{G_{S_1}}^{(opt)}}{P_{S_1}^{(opt)}} \geq \frac{P_{G_{S_2}}}{P_{S_{S_2}}} \Rightarrow P_{G_{S_1}}^{(opt)} \cdot P_{S_{S_2}} - P_{G_{S_2}} \cdot P_{S_{S_1}}^{(opt)} \geq 0 \tag{7}$$

The optimal result ROI of the new winning region $S_1+S_2$ as $$R_{res(S_1+S_2)}^{(opt)},$$

and then compare:

$$\frac{P_{G(S_1+S_2)}^{(opt)}}{P_{(S_1+S_2)}^{(opt)}} - \frac{P_{G_1}^{(opt)}}{P_{S_1}^{(opt)}} = -\frac{P_{G_{S_1}}^{(opt)} \cdot P_{S_{S_2}} - P_{G_{S_2}} \cdot P_{S_{S_1}}^{(opt)}}{\left(P_{S_{S_1}}^{(opt)} + P_{S_{S_2}}\right) \cdot P_{S_{S_1}}^{(opt)}} \leq 0 \tag{8}$$

Eq. (8) indicates that $$R_{res}^{(opt)}$$

decreases as $$R_{thr}^{(opt)}$$

decreases, and thus the proof is completed.

Theorem 3 is provided as following. For data delivery with different $R_{target}$ and $S_{cap}$ constraints, the optimal gmv $$P_G^{(opt)}$$

and spend $$P_S^{(opt)}$$

is monotone decreasing with regard to $$P_{res}^{(opt)}.$$

Proof of Theorem 3 is then provided. Same with proof of Theorem2, assuming $$R_{thr}^{(opt)}$$

is moved between $$R_{thr}^{\prime(opt)} \text{ and } R_{thr}^{\prime\prime(opt)}$$

under different $R_{target}$ and $S_{cap}$ constraints, extra auction opportunities with $$\Delta P_G = P_{G_{S_2}} \text{ and } \Delta P_S = P_{S_{S_2}}$$

are won, which are definitely greater than 0. Then $$P_{G(S1+S2)}^{(opt)} = P_{G_1}^{(opt)} + P_{G_{S_2}} \geq P_{G_{S_1}}^{(opt)}$$

and $$P_{(S1+S2)}^{(opt)} = P_{S_{S_1}}^{(opt)} + P_{S_{S_2}} \geq P_{S_{S_1}}^{(opt)},$$

i.e. the gmv and spend of the new winning region $S_1+S_2$ are greater than the origin winning region $S_1$ along with $$R_{thr}^{(opt)}$$

less than $$R_{thr}^{\prime(opt)}.$$

Noting that $$R_{res}^{(opt)}$$

has been proved to be monotone increasing with regard to $$R_{thr}^{(opt)}$$

in Theorem 2, $$P_G^{(opt)}$$

is attained and $$P_S^{(opt)}$$

is monotone decreasing with regard to $$R_{res}^{(opt)},$$

thus the proof of Theorem 3 has been finished.

With consideration of d(t), the value of $$R_{thr}^{(opt)}$$

in the THRESHOLD algorithm may exhibit variations. However, the final optimal GMV and ROI still conform to Theorem 3. Thus, we may construct a relation function between the optimal GMV $$P_G^{(opt)}$$

and ROI $$R_{res}^{(opt)}.$$

Treat the $R_{target}$, as set by the data provider, to be the optimal ROI (i.e., Eq. (4) is equivalent), allowing for the calculation of optimal GMV $$P_G^{(opt)}$$

and thereby the optimal spend $$P_S^{(opt)}.$$

The function parameters are computed based on GMV and ROI posterior data aggregated over a long period (such as n days). Given the minor impact of d(t) on long-term posterior data, $c_i$ may be fully restored within 48 hours, and only accumulated data is employed, thereby dodging the coarse-grained and hysteresis challenges. Further, given the minor impact of d(t) on long-term posterior data, due to the large sample size of the long-term results, the stochastic challenges impact is considerably less than that of small samples in a short period. So that the optimal functional relationship may be approximated. For example, as shown from FIG. 4, $R_{thr}$ indicates the reduction in $R_{res}$ for each additional auction opportunity, precisely representing the concept of marginal ROI. Function $$F\left(P_G^{(opt)}\right) = R_{res}^{(opt)}$$

may take various forms depending on the circumstances. For clarity, an example is provided, it is inferred that the optimal marginal ROI $$R_{thr}^{(opt)}$$

and optimal GMV $$P_G^{(opt)}$$

bear a linear relationship according to Theorem 2 and Theorem 3.

$$R_{thr}^{(opt)} = F'\left(P_G^{(opt)}\right) = a \cdot P_G^{(opt)} + b \tag{9}$$

In Eq. (9), a and b are hyperparameters, then the following equations may be obtained.

$$R_{res}^{(opt)} = F\left(P_G^{(opt)}\right) = \frac{a \cdot P_G^{2(opt)}}{2} + b \cdot P_G^{(opt)} \tag{10}$$

$$P_G^{(opt)} = \frac{\sqrt{b^2 + 2a \cdot R_{res}^{(opt)}} - b}{a} \tag{11}$$

According to Eq. (1), the following equation may be further obtained.

$$P_S^{(opt)} = \frac{P_G^{(opt)}}{R_{res}^{(opt)}} = \frac{\sqrt{b^2 + 2a \cdot R_{res}^{(opt)}} - b}{a \cdot R_{res}^{(opt)}} \tag{12}$$

To figure out the parameters a and b, the cumulative GMV and ROI over a defined spending period (such as one day) may be synthesized to generate a single sample point. The data points over multiple days then may be aggregated and derived parameters a and b through multi-point fitting. Numerous existing methods may be consulted for model parameter determination to achieve minimum MSE across multiple sample points. Once parameters a and b are determined, target ROI of the data provider, $R_{target}$, may be input into Eq. (12) to procure the optimal spending $$P_S^{(opt)}$$

for a defined spending duration. Given the spend constraint Eq. (3), $S^{(opt)}$ is assessed as $$\min\left(P_S^{(opt)}, S_{cap}\right).$$

After finding the $$P_S^{(opt)},$$

it is distributed over a shorter period through a budget allocation curve, obtaining the $$P_{S_l}^{(opt)}$$

for a brief time interval $t_l$. This may guide the optimal bid within $t_l$ during the micro stage.

Regarding micro bidding optimization, as previously noted, the overall optimal spend $$P_S^{(opt)}$$

has been determined in the macro stage. Then a budget allocation method is used to obtain the optimal $$P_{S_l}^{(opt)}$$

for a brief time interval $t_l$. The objective of the micro process is to spend exactly $$P_{S_l}^{(opt)}$$

within $t_l$. Ideally, the THRESHOLD algorithm could be directly employed to compute $R_{thr}$ through Eq. (9), then calculate the optimal bid through Eq. (5). Nevertheless, in data security scenarios demanding the consideration of d(t), short-term GMV and ROI are influenced by the aforementioned challenges, inhibiting the acquisition of suitable a and b parameters for Eq. (9). As a result, the THRESHOLD algorithm needs to be refined to find the specific $R_{thr}$ value without depending on GMV and ROI, ensuring fulfilling the $$P_{S_l}^{(opt)}$$

spend.

It is worth acknowledging that in data security scenarios, while $c_i$ is impacted by d(t), its spend is unaffected. The spend may be immediately collected as soon as the data delivery has been displayed via the widely accepted OCPM mechanism (or any other pricing method charging by display or click), indicating that the spend may be gathered in real-time, undisturbed by hysteresis and stochastic challenges.

Hence, it is aimed to build a model for $R_{thr}$ and spend $P_S$. In accord with Theorem 2 and Theorem 3, under ideal circumstances, $R_{thr}$ and $P_S$ monotonically decrease. Assuming that d(t) maintains the $r_i$ order for all auction opportunities, Theorem 2 and Theorem 3 continue to hold in data security scenarios featuring a different optimal $R_{thr}$ than the ideal, as exhibited in Eq. (6). The following algorithm is proposed to construct a linear interpolation model for $R_{thr}$ and $P_S$, termed the Interpolation-based MPC method (IMPC). By utilizing spending data from a brief time slice $t_l$ only, the $R_{thr}$ and then $b_{l+1}$ for the subsequent time interval $t_{l+1}$ may be computed. The specific algorithm is delineated in Algorithm 2. FIG. 5 illustrates an example diagram 500 of the Algorithm 2 according to implementations of the present disclosure.

It is summarized that the IMPC, as described in Algorithm 2 as shown in FIG. 5, offers several key advantages. Firstly, there is no cumulative error. For each $t_l$, the optimal bid $b_l$ depends only on a predetermined $$P_{S_l}^{(opt)},$$

and remains unaffected by previous control effects, unlike feedback control methods. Secondly, there is no prior function distribution required. Essentially as a non-parametric regression model, it ensures high accuracy. Thirdly, the IMPC provides robustness and portability. Relying only on real-time settlement data, it proves to be stable and effective even in high-frequency computations.

Regarding multi-channel promotion, in practical, data providers usually deliver data on more than one channel regardless of data security constraints with spend sharing, and each channel has its own $R_{target}$ constrain. Here, the channel may include but not be limited to an application, a website, or another channel where the data may be displayed. Therefore, the problem to be solved is extended to:

$$\max \sum_{j=1}^{M} c_{channel_j} \cdot v_{a_{channel_j}} \tag{13}$$

$$\sum_{j=1}^{M} P_{S_{channel_j}} \leq S_{cap} \tag{14}$$

$$S_{floor_{channel_j}} \leq P_{S_{channel_j}} \leq S_{channel_j}, \quad \forall i \in \{1, \ldots, M\} \tag{15}$$

$$R_{res_{channel_j}} \geq R_{target_{channel_j}}, \quad \forall i \in \{1, \ldots, M\} \tag{16}$$

$$R_{res} \geq R_{target} \tag{17}$$

Due to the differences in the estimated deviation di and target ROI $R_{target}$ between different channels in mixed data security and non-data security scenarios, the single channel SPB solution proposed above cannot be directly used. SPB is further expanded to multiple channels, which macro part is jointly solved, while micro part is separately solved. In the macro part, the expected optimal spend $S_{channel_j}$ for each channel needs to be simultaneously produced. Before that, Theorem 4 and the proof of this theorem are provided in the following.

Regarding Theorem 4, when the overall $P_G$ is maximum, there must be equal $R_{thr}$ for each channel. The proof is produced by contradiction. Considering the situation of two channels $ch_1$ and $ch_2$, assuming the overall $P_G$ is maximum with $$R_{thr_{ch_1}} > R_{thr_{ch_2}},$$

then move $$R_{thr_{ch_1}}$$

down of a exiguity $$\Delta R^{-}_{thr_{ch_1}}$$

and move $$R_{thr_{ch_2}}$$

up of an exiguity $$\Delta R^{+}_{thr_{ch_2}}$$

with $$\Delta P^{+}_{S_{ch_1}} = \Delta P^{-}_{S_{ch_2}}.$$

Obviously there is $$\Delta R^{-}_{res_{ch_1}} > \Delta R^{+}_{res_{ch_2}}$$

and $$\Delta P_{G_{ch}} = \Delta P_{S_{ch}} \cdot R_{res_{ch}},$$

then $$\Delta P^{+}_{G_{ch_1}} > \Delta P^{-}_{G_{ch_2}}$$

may be obtained, i.e., moving a portion of spend in $ch_2$ to $ch_1$ may obtain an overall $$P'_G \text{ that } P'_G > P_G,$$

which contradicts our initial assumption of $P_G$ being maximal.

According to Theorem 4, the optimal spend for each channel through a binary search method which is detailed in Algorithm 3 may be determined. FIG. 6 illustrates an example diagram 600 of Algorithm 3 according to implementations of the present disclosure. As illustrated in FIG. 6, upon determining $R_{thr}$, it cannot directly bid using Eq. (5) due to the variance in di across different channels. Therefore, $S_{channel_j}$ akin to the macro stage should be firstly computed, constructing a functional correlation between GMV and ROI for each channel. Subsequently, the IMPC algorithm is independently applied to channel to derive the optimal bid $b_{channel_j}$.

The performance of the SPB method may be validated through online and offline experiments. In an example, online experiments may be conducted on an industrial dataset collected from a data delivery platform to compare the performance of SPB with other advanced methods in real-world industrial application circumstances. FIG. 7 illustrates an example diagram of the industrial dataset according to implementations of the present disclosure. As shown in FIG. 7, three datasets are randomly selected for the experiment, one from campaigns using SKAN attribution, one from campaigns using PCM attribution and another from campaigns using non-data security constrained. As a result of the experiment, the SPB method may improve GMV and revenue compared with conventional methods.

Having described brief of the data delivery management in the SPB method, hereinafter, more details will be provided. The to-be-delivered data may include multimedia data such as messages, videos, advertisements which is delivered by data provider. The data provider may submit a data delivery request with a bid, and if the bid wins, the data specified by the request may be delivered. In implementations of the present disclosure, delivery data 230 associated with a plurality of delivery time points in a first time window may be obtained. The first time window is a long time window, for example, it may be a 7-day time window (or another length). In an example, there may be a plurality of delivery data requests at each delivery time point and the data specified by only one delivery data request satisfying a requirement (e.g., wining a bid) may be displayed at each delivery time point.

The delivery data comprises a resource cost associated with a delivery time point in the plurality of delivery time points, and a contribution that is caused by the resource cost to a delivery purpose. The resource cost may include time cost, labor cost, operation cost, etc. The contribution may refer to converts, ROI, CPA (Cost Per Action) and the like. For example, if data is delivered at time point t0 and there is a click event for the data, the click event is regarded as a convert.

In implementations of the present disclosure, a second time window is determined. The second time window is specified by a data provider of the data delivery to verify whether the contribution meets the delivery purpose. The second time window is a short time window, for example, it may be a 1-day time window (or another length). The data provider may have an expected delivery purpose (e.g., 10 converts in a day, and the like) and the data provider may verify whether the contribution meets the delivery purpose in the second time window.

In implementations of the present disclosure, a prediction model is obtained based on the delivery data, and the first and second time windows. The delivery data occurred in the first time window may be used to train the prediction model and the prediction model is valid to predict within the duration of first time window. For example, if the first time window is a 7-day time window, the prediction model may be used to predict data of the seventh day given the data from the previous 6 days. In an example, the prediction model may be expressed as follows:

$$F(\text{cost}) = \text{convert} \tag{18}$$

In Eq. (18), cost represents a resource cost associated with a delivery time point, and convert represents a contribution.

The prediction model indicates an association relationship between delivery data associated with a plurality of previous delivery time points in a third time window and a predicted resource cost indicating a total resource cost corresponding to a fourth time window that follows the third time window. Taking the prediction model is valid for the 7-day time window as an example, the third time window is the previous 6 days of the of a 7-day time window and the fourth time window is the seventh day of the 7-day time window. In other words, the prediction model may predict the resource cost of the fourth time window (for example, the seventh day) based on the delivery data of the third time window (for example, the previous 6 days). With these implementation, the prediction model is trained with data in a long time window, the delay between the event and report is covered by the long time window and thus the prediction model may be trained in an accurate way.

In implementations of the present disclosure, with respect to the delivery time point in the plurality of delivery time points in the first time window, an intermediate model may be determined based on an inverse proportional function that describes a degree of an impact of the resource cost on the contribution. According to law of diminishing marginal utility, as converts (as an example of the contribution) increases, the marginal utility gradually decreases. Therefore, there is an inverse relationship proportional function that describes a degree of an impact of the resource cost on the contribution. The inverse proportional function may employ a linear function, an exponential function, a logarithmic function, etc. With these implementations of the present disclosure, the relationship between the converts and marginal utility may be accurately determined and thus an appropriate intermediate model may be determined.

In implementations of the present disclosure, the inverse proportional function may be a linear inverse proportional function represented by a group of linear parameters. Because the marginal utility (denoted as F'(cost) according to Eq. (18)) decreases as the converts increase, the inverse proportional function may be expressed as follows:

$$\frac{1}{F'(\text{cost})} = a \cdot F(\text{cost}) + b \tag{19}$$

In Eq. (18), F'(cost) represents marginal utility, F(cost) represents converts, a and b represent a group of linear parameters. With these implementations of the present disclosure, the linear inverse proportional function is easy to calculate and analyze due to its simplicity and intuitiveness, thereby improving the effectiveness of data delivery.

After determining the intermediate model, the prediction model may be determined based on the intermediate model and the delivery data.

In implementations of the present disclosure, a group of candidate values for the group of linear parameters may be determined based on the linear inverse proportional function and the delivery data. The resource cost and contribution contained in the delivery data may be plugged into Eq. (19), to obtain candidate values for a and b.

In implementations of the present disclosure, with respect to the delivery time point in the plurality of delivery time points in the first time window, the group of candidate values may be determined by updating the linear inverse proportional function with the resource cost associated with the delivery time point and the contribution caused by the resource cost to the delivery purpose. Each delivery time point corresponds to a resource cost and a contribution. For example, if there are 1000 delivery time points, then there are 1000 pairs of resource cost and contribution. By updating the linear inverse proportional function with these 1000 pairs of resource cost and contribution, the group of candidate values may be determined.

Then, the prediction model may be represented by the group of candidate values. The prediction model represented by the group of candidate values may be expressed as follows:

$$F(\text{cost}) = \frac{\sqrt{b^2 + 2a \cdot \text{cost}} - b}{a} \tag{20}$$

In implementations of the present disclosure, previous delivery data associated with a plurality of previous delivery time points in a previous time window may be obtained. The previous delivery data may comprise a previous resource cost associated with a previous delivery time point in the plurality of previous delivery time points, and a previous contribution caused by the previous resource cost to the delivery purpose. Then, a predicted resource cost associated with the subsequent time window based on the prediction model and the previous delivery data may be determined. Taking the prediction model is used for a 7-day time window as an example, the previous delivery data may include the delivery data of the previous 6 days. The prediction model may output the predicted resource cost associated with the seventh day (i.e., the subsequent time window) based on the previous 6 days. With these implementations of the present disclosure, a stable, lightweight and effective prediction model may be proposed.

In implementations of the present disclosure, a unit cost and a resource threshold that are specified by the data provider are obtained. In an example, the unit cost may be obtained by diving a total resource cost by the number of converts, where the total resource cost is less than the resource threshold.

After obtaining the unit cost and the resource threshold, a predicted resource cost with the subsequent time window may be determined based on the prediction model and the previous delivery data under constraints of the unit cost and the resource threshold. The process of determining the predicted resource cost may be expressed as follows:

$$\begin{gathered} \arg\max AdvValue = F(\text{cost}) * \text{adv\_cpa} \\ 0 \le \text{cost} \le \text{adv\_budget} \\ \text{s.t.} \\ \frac{\text{cost}}{F(\text{cost})} = \text{expected\_cpa} < \text{adv\_cpa} \end{gathered} \tag{21}$$

In Eq. (21), adv_cpa represents the unit cost (also referred to as the performance of the data delivery, or delivery performance), adv_budget represents the resource threshold. By applying the two constraints in Eq. (21), the following expression may be obtained.

$$cpa = \frac{\text{cost}}{F(\text{cost})} = \frac{\sqrt{b^2 + 2a \cdot \text{cost}} + b}{2} \tag{22}$$

Eq. (22) may be transformed into:

$$\text{cost} = \frac{(2 \cdot cpa - b)^2 - b^2}{2a} \tag{23}$$

By using Eq. (23), a predicted resource cost associated with the subsequent time window may be determined.

In implementations of the present disclosure, a plurality of candidate resource costs may be determined based on the prediction model and the previous delivery data. The prediction model may generate the plurality of candidate resource costs based on the previous delivery data. Then, a candidate resource cost that meets the constraint of the unit cost is selected from the plurality of candidate resource costs as the predicted resource cost. The unit cost may be represented by the candidate resource costs and a predicted contribution corresponding to the candidate resource cost. In an example, the candidate resource cost may not only meet the constraint of the unit cost, but also maximize a value (denoted as F(cost)*adv_cpa) specified by the data provider.

In implementations of the present disclosure, the plurality of candidate resource costs under the constraint of the resource threshold may be determined and the plurality of candidate resource costs are below than the resource threshold.

In implementations of the present disclosure, the first length of the first time window may be greater than a time delay between a time point when the contribution is received and the time point. Due to data security policy, there may be a time delay between a time point when the contribution is received and the time point. The first length may cover the time delay to incorporate more data in the training of the prediction. With these implementations of the present disclosure, the training data are accurate data that reflects the converts collected in a long time window. Therefore, the report delay caused by the data protection strategy may be alleviated and thus the prediction model may be trained in a more accurate way.

It is to be understood that the above Eqs. (18)-(23) only provide an implementation for managing resource allocation. In another implementation, more or less steps may be included, for example, in the above SPB framework, the macro spend planning may be implemented according to the proposed long and short time windows solution. Specifically, Eqs. (7)-(12) may be adopted for determining the resource cost. Here, $R_{target}$ and $S_{cap}$ corresponds to the unit cost and resource threshold constrains, $$P_G^{(opt)}$$

corresponds to the contribution, and $$P_S^{(opt)}$$

corresponds to the resource cost. Therefore, based on the prediction model may be built in an accurate way.

The following paragraphs will provide more details about the data delivery across multiple channels. In implementations of the present disclosure, returning to FIG. 2, delivery performance 250 for data delivery across the plurality of channels may be obtained. Delivery performance 250 may also be referred to as margin_cpa which is a kind of marginal cost. The initial delivery performance 250 may be set to a random number. The plurality of channels may include different platforms, applications, etc.

Then, a plurality of resource costs (e.g., the resource cost 230 and the resource cost 232) for the data delivery across the plurality of channels (e.g., the channel 210 and the channel 212) are determined based on the delivery performance 250 and a plurality of predetermined models (e.g., the model 220 and the model 222). The plurality of predetermined models being corresponding to the plurality of channels respectively. For example, the model 220 is corresponding to the channel 210. With respect to a target channel (e.g., the channel 210) in the plurality of channels, a target predetermined model (e.g., the model 220) in the plurality of predetermined models that corresponds to the target channel represents an association relationship between a resource cost (e.g., the resource cost 230) for data delivery on the target channel and a delivery performance 250 of data delivery on the target channel. The association relationship may be expressed by resource cost=function1(publication performance). In an example, function1 may be based on the function shown in Eq. (23), where cost represents the resource cost for data delivery on the target channel and cpa represents the delivery performance 250 of data delivery on the target channel. The delivery performance 250 is represented by the resource cost and a delivery purpose (also referred to as convert) caused by the resource cost. In an example, the delivery performance 250 may be obtained by diving the resource cost by the delivery purpose.

In implementations of the present disclosure, with respect to the target channel, a resource cost may be determined based on the delivery performance and the target model. There are different models for different channels, respectively. Taking the target channel is channel 210 as an example, the resource cost may be determined based on the delivery performance 250 and the model 220. The model 220 may be represented as resource cost=function1(publication performance). In an example, the model 220 may be the function shown in Eq. (23), and hyperparameters a and b may be different for different channels. With these implementations, there are different models for different channels and the resource cost may be accurately obtained by taking into account characteristics of respective channels.

After the plurality of resource costs are determined, the delivery performance 250 may be updated based on a sum of the plurality of resource costs and a resource cost constraint associated with the data delivery across the plurality of channels.

In implementations of the present disclosure, a performance range of the delivery performance 250 for data delivery across the plurality of channels may be determined. The performance range may include an upper threshold and a lower threshold, and then the delivery performance 250 may be adjusted within the performance range by exploring up or exploring down. In an example, the upper threshold may be set to positive infinity or a relatively large numerical value, and the lower threshold may be set to 0 or a relatively small numerical value. After determining the performance range, the delivery performance may be selected within the performance range. With these implementations, the delivery performance may be converged within the performance range, which makes the value of the delivery performance more reliable.

In implementations of the present disclosure, in response to determining that the sum of the plurality of resource costs is above the resource cost constraint, the delivery performance 250 is adjusted by exploring down within the performance range in a direction towards a lower threshold of the performance range. If the sum of the plurality of resource costs is above the resource cost constraint, the data provider may run out of resources and the delivery performance 250 needs to be decreased. In an example, if the delivery performance 250 is 50 and the lower threshold is 0, the delivery performance may be adjusted toward 0 within the performance range, such as 10, 20, 25 etc.

In implementations of the present disclosure, a plurality of delivery purposes associated with the data delivery across the plurality of channels may be determined based on the plurality of predetermined models and the plurality of resource costs. In an example, the predetermined model may be the function shown in Eq. (18), where cost represents the plurality of resource costs and convert represents the plurality of delivery purposes. Then, a total performance of the data delivery across the plurality of channels may be determined based on the sum of the plurality of resource costs and a sum of the plurality of delivery purposes. In an example, the total performance may be obtained by dividing the sum of the plurality of resource costs by the sum of the plurality of delivery purposes. After determining the total performance, the delivery performance may be adjusted within the performance range based on the total performance of the data delivery.

In implementations of the present disclosure, in response to determining that the total performance of the data delivery is above a performance constraint, the delivery performance may be adjusted towards a lower threshold of the performance range. In an example, if the delivery performance 250 is 50 and the lower threshold is 0, the delivery performance may be adjusted toward 0 within the performance range, such as 10, 20, etc.

In addition, or alternatively, in response to determining that the total performance of the data delivery is below a performance constraint and the sum of plurality of resource costs is below the resource cost constraint, the delivery performance may be adjusted by exploring up towards an upper threshold of the performance range. If the data delivery is below a performance constraint and the sum of plurality of resource costs is below the resource cost constraint, the data provider may still have resources to spend and the delivery performance 250 needs to be increased. In an example, if the delivery performance 250 is 50 and the upper threshold is 100, the delivery performance may be adjusted toward 100 within the performance range, such as 75, 80, 90, etc.

In implementations of the present disclosure, the delivery performance 250 may be adjusted based on bisection of the delivery performance 250 and the lower threshold. In an example, if the delivery performance 250 is 50 and the lower threshold is 0, the delivery performance 250 may be adjusted to 25 (calculated by(delivery performance 250−lower threshold)/2).

In implementations of the present disclosure, the delivery performance 250 may be adjusted based on bisection of the delivery performance 250 and the upper threshold. In an example, if the delivery performance 250 is 50 and the upper threshold is 100, the delivery performance 250 may be adjusted to 75 (calculated by(delivery performance 250+lower threshold)/2). With these implementations, the efficiency of finding the optimal value is improved and computational resources may be saved.

In implementations of the present disclosure, the delivery performance 250 may be updated in response to determining that a difference between the delivery performance 250 and the updated delivery performance does not meet a convergence condition. In an example, the convergence condition may refer that the difference between the delivery performance 250 and the updated delivery performance is less than a predetermined threshold. Alternatively, the delivery performance 250 may be updated until a predetermined number of updating operations is reached. In implementations of the present disclosure, the upper threshold may be set to the previous delivery performance 250 if the down exploring is implemented, and the lower threshold may be set to the previous delivery performance 250 if the up exploring is implemented. At this point, the convergence condition may refer that the difference between the upper threshold and the lower threshold is less than a predetermined threshold. The updated delivery performance is the same for all channels, which is the optimal solution for the data provider.

In implementations of the present disclosure, the resource cost may be updated by a target cost constraint corresponding to the target channel. The target cost constraint may include an upper boundary and a lower boundary. If the resource cost is not within a range between the upper boundary and the lower boundary, the resource cost may be updated to the upper boundary or the lower boundary.

In implementations of the present disclosure, after the updated delivery performance is determined, a target resource cost for the target channel may be determined based on the updated delivery performance and the target model. The target model may include the function shown in Eq. (23), where cpa represents the updated delivery performance and cost represents the target resource cost. Then, based on Algorithm 2, a threshold (also referred to as bid) for the target resource cost may be determined based on the target resource cost. Two closest points for target resource cost may be obtained, and each point has a resource cost and a threshold. Interpolation or extrapolation may be performed on the two closest points to determine the threshold for the target resource cost. Further, a data delivery request for delivering data on the target channel based on the threshold may be submitted. Whether the data delivery request wins in delivering data is determined by the ranking of the threshold.

Figure 8:
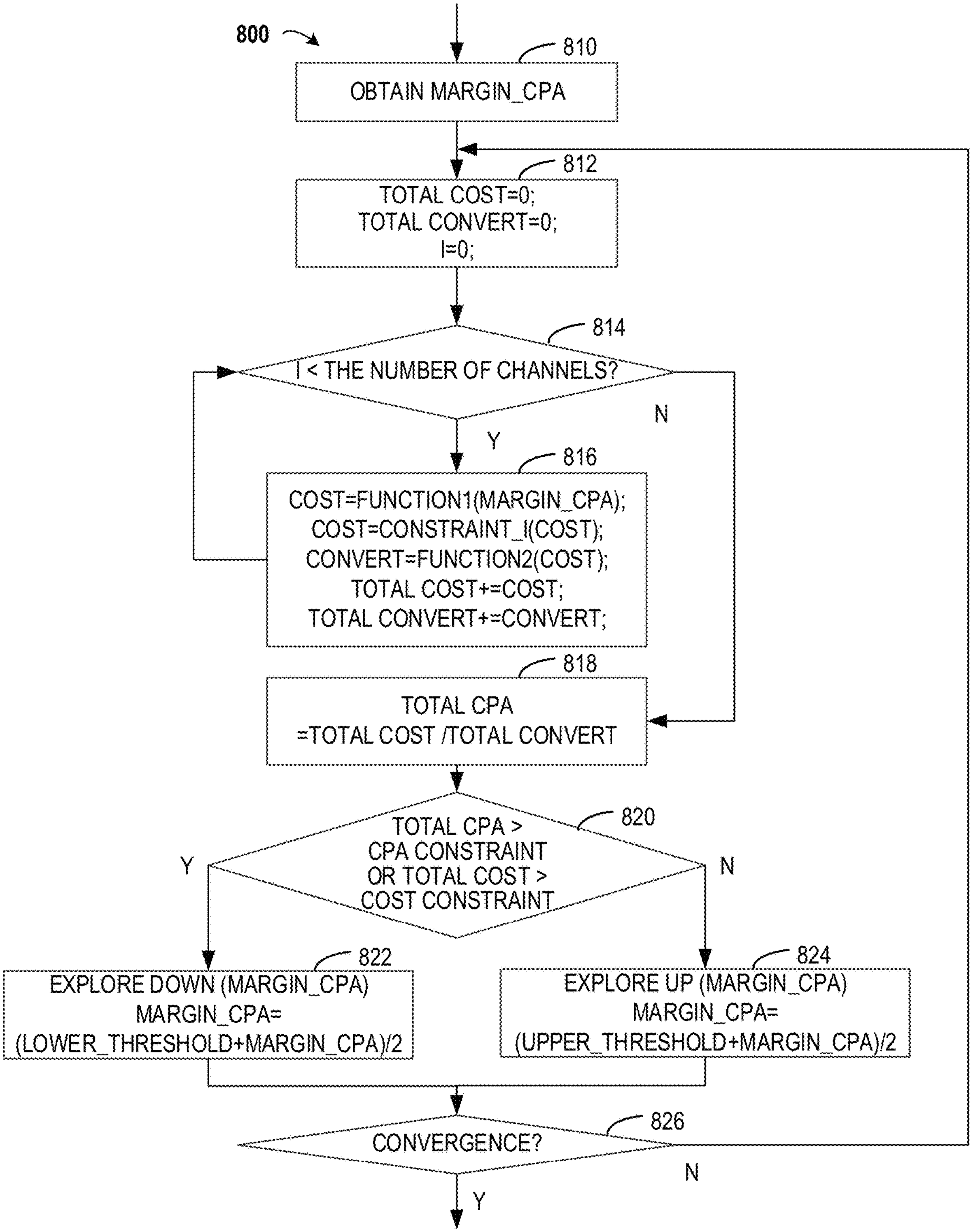
FIG. 8 illustrates an example process of managing data delivery across a plurality of channels across a plurality of channels according to implementations of the present disclosure.

Referring to FIG. 8 for a detailed process, here FIG. 8 illustrates an example process 800 of managing data delivery across a plurality of channels according to implementations of the present disclosure. As illustrated, at block 810, margin_cpa (also referred to as the delivery performance) is obtained. The initially obtained margin_cpa may be a random number. At block 812, total cost (also referred to as the sum of the plurality of resource costs) is set to 0, total convert (also referred to as the sum of the plurality of delivery purposes) is set to 0, i (the index of the plurality of channels) is set to 0.

At block 814, whether i is less than the number of channels is determined. If i is less than the number of channels is determined, the process 800 may proceed to block 816. At block 816, a cost (also referred to as the resource cost) may be obtained by applying function1 (margin_cpa), where the function1( ) may be based on the function shown in Eq. (23). The cost may be updated by a target cost constraint corresponding to the target channel. A convert may be obtained by applying function2 (cost), where function2( ) may be based on the function shown in Eq. (18). The total cost equals to the sum of costs in different channels and the total convert equals to the sum of converts in different channels.

If i is not less than the number of channels, the process 800 may proceed to block 818. At block 818, the total cpa (also referred to as the total performance) is may be obtained by dividing the total cost by the total convert.

At block 820, whether the total cpa is greater than a cpa constraint or total cost is greater than a cost constraint is determined. If the total cpa is greater than a cpa constraint or total cost is greater than a cost constraint, the process 800 may proceed to block 822. At block 822, the margin_cpa may be updated downward. For example, the margin_cpa is obtained by (lower_threshold+margin_cpa)/2, where the lower_threshold represents the lower threshold of a range of margin_cpa. Otherwise, the process 800 may proceed to block 824. At block 824, the margin_cpa may be updated upward. For example, the margin_cpa is obtained by (upper_threshold+margin_cpa)/2, where the upper_threshold represents the upper threshold of the range of margin_cpa.

At block 826, whether a convergence condition is meet is determined. If the convergence condition is meet, the process 800 is completed. Otherwise, the process 800 may be reperformed.

FIG. 9 illustrates an example diagram of a multi-channel promotion algorithm according to implementations of the present disclosure. The algorithm shown in FIG. 9 is corresponding to the process 800.

It is to be understood that the above FIG. 8 and FIG. 9 only provides an implementation for managing data delivery across a plurality of channels. In another implementation, more or less steps may be included, for example, algorithm 3 shown in FIG. 6 may be implemented. Here, $R_{target}$ and $S_{cap}$ corresponds to the performance and resource threshold constrains, and $R_{thr}$ corresponds to the performance for the data delivery across multiple channels. As shown in lines 3 to 7, $R_{res}$ (corresponding to the total performance) and $S^{(opt)}$ may be determined across the multiple channels, and then $R_{thr}$ may be explored in the up direction or in the down direction until the convergence condition is met. Therefore, based on the prediction model may be built in an accurate way.

Figure 10:
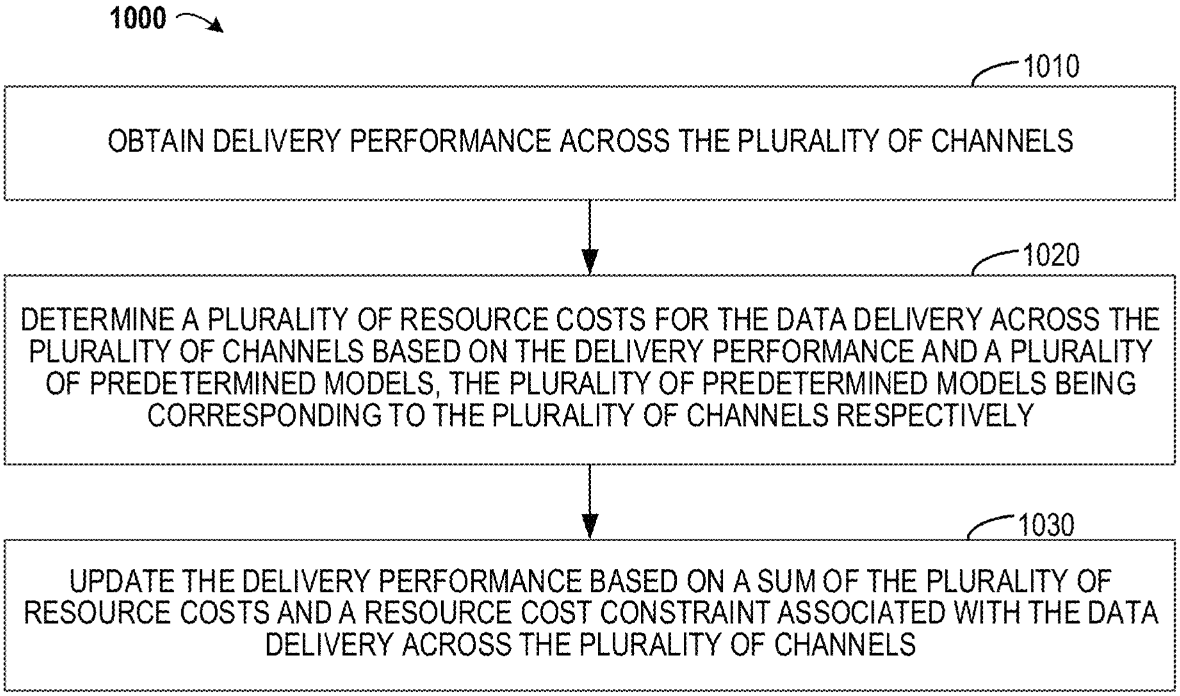
FIG. 10 illustrates an example flowchart of a method for managing data delivery according to implementations of the present disclosure.

The above paragraphs have described details for the managing data delivery across a plurality of channels. According to implementations of the present disclosure, a method is provided for managing data delivery. Reference will be made to FIG. 10 for more details about the method, where FIG. 10 illustrates an example flowchart of a method 1000 for managing data delivery across a plurality of channels according to implementations of the present disclosure. At block 1010, delivery performance for data delivery across the plurality of channels is obtained. At block 1020, a plurality of resource costs for the data delivery across the plurality of channels are determined based on the delivery performance and a plurality of predetermined models. The plurality of predetermined models are corresponding to the plurality of channels respectively, and with respect to a target channel in the plurality of channels, a target predetermined model in the plurality of predetermined models that corresponds to the target channel represents an association relationship between a resource cost for data delivery on the target channel and a delivery performance of data delivery on the target channel. The delivery performance is represented by the resource cost and a delivery purpose caused by the resource cost. At block 1030, the delivery performance is updated based on a sum of the plurality of resource costs and a resource cost constraint associated with the data delivery across the plurality of channels.

In implementations of the present disclosure, determining the plurality of resource costs comprises: with respect to the target channel, determining a resource cost based on the delivery performance and the target model.

In implementations of the present disclosure, obtaining the delivery performance comprises: determining a performance range of the delivery performance for data delivery across the plurality of channels; and selecting the delivery performance within the performance range.

In implementations of the present disclosure, updating the delivery performance comprises: in response to determining that the sum of the plurality of resource costs being above the resource cost constraint, adjusting the delivery performance within the performance range in a direction towards a lower threshold of the performance range.

In implementations of the present disclosure, the method 1000 further comprises: determining a plurality of delivery purposes associated with the data delivery across the plurality of channels based on the plurality of predetermined models and the plurality of resource costs; determining a total performance of the data delivery across the plurality of channels based on the sum of the plurality of resource costs and a sum of the plurality of delivery purposes; and adjusting the delivery performance within the performance range based on the total performance of the data delivery.

In implementations of the present disclosure, adjusting the delivery performance within the performance range based on the total performance of the data delivery comprises at least any of: in response to determining that the total performance of the data delivery being above a performance constraint, adjusting the delivery performance towards a lower threshold of the performance range; or in response to determining that the total performance of the data delivery being below a performance constraint and the sum of plurality of resource costs being below the resource cost constraint, adjusting the delivery performance towards an upper threshold of the performance range.

In implementations of the present disclosure, adjusting the delivery performance towards the lower threshold of the performance range comprises: adjusting the delivery performance based on bisection of the delivery performance and the lower threshold; and adjusting the delivery performance towards the upper threshold of the performance range comprises: adjusting the delivery performance based on bisection of the delivery performance and the upper threshold.

In implementations of the present disclosure, updating the delivery performance comprises: updating the delivery performance in response to determining that a difference between the delivery performance and the updated delivery performance does not meet a convergence condition.

In implementations of the present disclosure, the method 1000 further comprises: updating the resource cost by a target cost constraint corresponding to the target channel.

In implementations of the present disclosure, the method 1000 further comprises: determining a target resource cost for the target channel based on the updated delivery performance and the target model; determining a threshold for the target resource cost based on the target resource cost; and submitting a data delivery request for delivering data on the target channel based on the threshold.

According to implementations of the present disclosure, an apparatus is provided for managing data delivery. The apparatus comprises: a delivery performance obtaining module configured for obtaining delivery performance for data delivery across the plurality of channels; resource costs determining module configured for determining a plurality of resource costs for the data delivery across the plurality of channels based on the delivery performance and a plurality of predetermined models, the plurality of predetermined models being corresponding to the plurality of channels respectively, and with respect to a target channel in the plurality of channels, a target predetermined model in the plurality of predetermined models that corresponds to the target channel representing an association relationship between a resource cost for data delivery on the target channel and a delivery performance of data delivery on the target channel, the delivery performance being represented by the resource cost and a delivery purpose caused by the resource cost; and a delivery performance updating module configured for updating the delivery performance based on a sum of the plurality of resource costs and a resource cost constraint associated with the data delivery across the plurality of channels.

According to implementations of the present disclosure, an electronic device is provided for implementing the method 1000. The electronic device comprises: a computer processor coupled to a computer-readable memory unit, the memory unit comprising instructions that when executed by the computer processor implements a method for managing data delivery. The method comprises: obtaining delivery performance for data delivery across the plurality of channels; determining a plurality of resource costs for the data delivery across the plurality of channels based on the delivery performance and a plurality of predetermined models, the plurality of predetermined models being corresponding to the plurality of channels respectively, and with respect to a target channel in the plurality of channels, a target predetermined model in the plurality of predetermined models that corresponds to the target channel representing an association relationship between a resource cost for data delivery on the target channel and a delivery performance of data delivery on the target channel, the delivery performance being represented by the resource cost and a delivery purpose caused by the resource cost; and updating the delivery performance based on a sum of the plurality of resource costs and a resource cost constraint associated with the data delivery across the plurality of channels.

In implementations of the present disclosure, determining the plurality of resource costs comprises: with respect to the target channel, determining a resource cost based on the delivery performance and the target model.

In implementations of the present disclosure, obtaining the delivery performance comprises: determining a performance range of the delivery performance for data delivery across the plurality of channels; and selecting the delivery performance within the performance range.

In implementations of the present disclosure, updating the delivery performance comprises: in response to determining that the sum of the plurality of resource costs being above the resource cost constraint, adjusting the delivery performance within the performance range in a direction towards a lower threshold of the performance range.

In implementations of the present disclosure, the method 1000 further comprises: determining a plurality of delivery purposes associated with the data delivery across the plurality of channels based on the plurality of predetermined models and the plurality of resource costs; determining a total performance of the data delivery across the plurality of channels based on the sum of the plurality of resource costs and a sum of the plurality of delivery purposes; and adjusting the delivery performance within the performance range based on the total performance of the data delivery.

In implementations of the present disclosure, adjusting the delivery performance within the performance range based on the total performance of the data delivery comprises at least any of: in response to determining that the total performance of the data delivery being above a performance constraint, adjusting the delivery performance towards a lower threshold of the performance range; or in response to determining that the total performance of the data delivery being below a performance constraint and the sum of plurality of resource costs being below the resource cost constraint, adjusting the delivery performance towards an upper threshold of the performance range.

In implementations of the present disclosure, adjusting the delivery performance towards the lower threshold of the performance range comprises: adjusting the delivery performance based on bisection of the delivery performance and the lower threshold; and adjusting the delivery performance towards the upper threshold of the performance range comprises: adjusting the delivery performance based on bisection of the delivery performance and the upper threshold.

In implementations of the present disclosure, updating the delivery performance comprises: updating the delivery performance in response to determining that a difference between the delivery performance and the updated delivery performance does not meet a convergence condition.

In implementations of the present disclosure, the method 1000 further comprises: updating the resource cost by a target cost constraint corresponding to the target channel.

In implementations of the present disclosure, the method 1000 further comprises: determining a target resource cost for the target channel based on the updated delivery performance and the target model; determining a threshold for the target resource cost based on the target resource cost; and submitting a data delivery request for delivering data on the target channel based on the threshold.

According to implementations of the present disclosure, a computer program product, the computer program product comprising a computer readable storage medium having program instructions embodied therewith, the program instructions executable by an electronic device to cause the electronic device to perform the method 1000.

Figure 11:
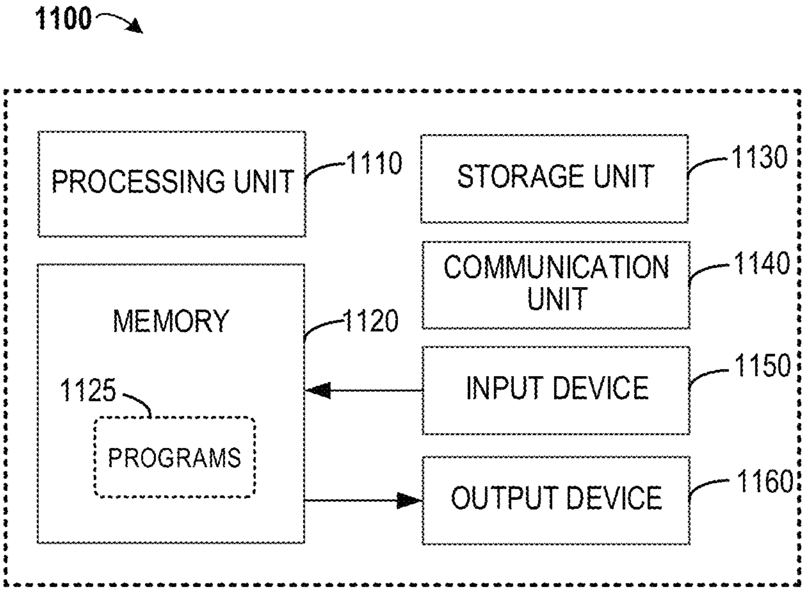
FIG. 11 illustrates a block diagram of a computing device in which various implementations of the present disclosure may be implemented.

FIG. 11 illustrates a block diagram of a computing device 1100 in which various implementations of the present disclosure may be implemented. It would be appreciated that the computing device 1100 shown in FIG. 11 is merely for purpose of illustration, without suggesting any limitation to the functions and scopes of the present disclosure in any manner. The computing device 1100 may be used to implement the above method 1000 in implementations of the present disclosure. As shown in FIG. 11, the computing device 1100 may be a general-purpose computing device. The computing device 1100 may at least comprise one or more processors or processing units 1110, a memory 1120, a storage unit 1130, one or more communication units 1140, one or more input devices 1150, and one or more output devices 1160.

The processing unit 1110 may be a physical or virtual processor and may implement various processes based on programs 1125 stored in the memory 1120. In a multi-processor system, multiple processing units execute computer executable instructions in parallel so as to improve the parallel processing capability of the computing device 1100. The processing unit 1110 may also be referred to as a central processing unit (CPU), a microprocessor, a controller, or a microcontroller.

The computing device 1100 typically includes various computer storage medium. Such medium may be any medium accessible by the computing device 1100, including, but not limited to, volatile and non-volatile medium, or detachable and non-detachable medium. The memory 1120 may be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1130 may be any detachable or non-detachable medium and may include a machine-readable medium such as a memory, flash memory drive, magnetic disk, or another other media, which may be used for storing information and/or data and may be accessed in the computing device 1100.

The computing device 1100 may further include additional detachable/non-detachable, volatile/non-volatile memory medium. Although not shown in FIG. 11, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1140 communicates with a further computing device via the communication medium. In addition, the functions of the components in the computing device 1100 may be implemented by a single computing cluster or multiple computing machines that may communicate via communication connections. Therefore, the computing device 1100 may operate in a networked environment using a logical connection with one or more other servers, networked personal computers (PCs) or further general network nodes.

The input device 1150 may be one or more of a variety of input devices, such as a mouse, keyboard, tracking ball, voice-input device, and the like. The output device 1160 may be one or more of a variety of output devices, such as a display, loudspeaker, printer, and the like. By means of the communication unit 1140, the computing device 1100 may further communicate with one or more external devices (not shown) such as the storage devices and display device, with one or more devices enabling the user to interact with the computing device 1100, or any devices (such as a network card, a modem, and the like) enabling the computing device 1100 to communicate with one or more other computing devices, if required. Such communication may be performed via input/output (I/O) interfaces (not shown).

In some implementations, instead of being integrated in a single device, some, or all components of the computing device 1100 may also be arranged in cloud computing architecture. In the cloud computing architecture, the components may be provided remotely and work together to implement the functionalities described in the present disclosure. In some implementations, cloud computing provides computing, software, data access and storage service, which will not require end users to be aware of the physical locations or configurations of the systems or hardware providing these services. In various implementations, the cloud computing provides the services via a wide area network (such as Internet) using suitable protocols. For example, a cloud computing provider provides applications over the wide area network, which may be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The functionalities described herein may be performed, at least in part, by one or more hardware logic components. For example, and without limitation, illustrative types of hardware logic components that may be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are illustrated in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

From the foregoing, it will be appreciated that specific implementations of the presently disclosed technology have been described herein for purposes of illustration, but that various modifications may be made without deviating from the scope of the disclosure. Accordingly, the presently disclosed technology is not limited except as by the appended claims.

Implementations of the subject matter and the functional operations described in the present disclosure may be implemented in various systems, digital electronic circuitry, or in computer software, firmware, or hardware, including the structures disclosed in this specification and their structural equivalents, or in combinations of one or more of them. Implementations of the subject matter described in this specification may be implemented as one or more computer program products, i.e., one or more modules of computer program instructions encoded on a tangible and non-transitory computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media, and memory devices, including by way of example semiconductor memory devices, e.g., EPROM, EEPROM, and flash memory devices. The processor and the memory may be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While the present disclosure contains many specifics, these should not be construed as limitations on the scope of any disclosure or of what may be claimed, but rather as descriptions of features that may be specific to particular implementations of particular disclosures. Certain features that are described in the present disclosure in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are illustrated in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations. Only a few implementations and examples are described and other implementations, enhancements and variations may be made based on what is described and illustrated in the present disclosure.

What is claimed is:

1. A method for managing data delivery across a plurality of channels, comprising:

obtaining delivery performance across the plurality of channels, the delivery performance having a value indicating a cost for the data delivery;

determining a plurality of resource costs for the data delivery across the plurality of channels based on the delivery performance and a plurality of predetermined models, the plurality of predetermined models being corresponding to the plurality of channels respectively, and with respect to a target channel in the plurality of channels, a target predetermined model in the plurality of predetermined models that corresponds to the target channel representing an association relationship between a resource cost for data delivery on the target channel and delivery performance of data delivery on the target channel, the target channel comprising each of the plurality of channels, the delivery performance of data delivery on the target channel being represented by the resource cost and a delivery purpose caused by the resource cost; and updating the delivery performance based on a sum of the plurality of resource costs and a resource cost constraint associated with the data delivery across the plurality of channels, the updated delivery performance being the same for the plurality of channels.

2. The method according to claim 1, wherein determining the plurality of resource costs comprises: with respect to the target channel, determining a resource cost based on the delivery performance and the target model.

3. The method according to claim 1, wherein obtaining the delivery performance comprises:

determining a performance range of the delivery performance for data delivery across the plurality of channels; and selecting the delivery performance within the performance range.

4. The method according to claim 3, wherein updating the delivery performance comprises: in response to determining that the sum of the plurality of resource costs being above the resource cost constraint, adjusting the delivery performance within the performance range in a direction towards a lower threshold of the performance range.

5. The method according to claim 3, further comprising:

determining a plurality of delivery purposes associated with the data delivery across the plurality of channels based on the plurality of predetermined models and the plurality of resource costs;

determining a total performance of the data delivery across the plurality of channels based on the sum of the plurality of resource costs and a sum of the plurality of delivery purposes; and adjusting the delivery performance within the performance range based on the total performance of the data delivery.

6. The method according to claim 5, wherein adjusting the delivery performance within the performance range based on the total performance of the data delivery comprises at least any of:

in response to determining that the total performance of the data delivery being above a performance constraint, adjusting the delivery performance towards a lower threshold of the performance range; or in response to determining that the total performance of the data delivery being below a performance constraint and the sum of plurality of resource costs being below the resource cost constraint, adjusting the delivery performance towards an upper threshold of the performance range.

7. The method according to claim 6, wherein:

adjusting the delivery performance towards the lower threshold of the performance range comprises: adjusting the delivery performance based on bisection of the delivery performance and the lower threshold; and adjusting the delivery performance towards the upper threshold of the performance range comprises: adjusting the delivery performance based on bisection of the delivery performance and the upper threshold.

8. The method according to claim 1, wherein updating the delivery performance comprises: updating the delivery performance in response to determining that a difference between the delivery performance and the updated delivery performance does not meet a convergence condition.

9. The method according to claim 1, further comprising: updating the resource cost by a target cost constraint corresponding to the target channel.

10. The method according to claim 1, further comprising:

determining a target resource cost for the target channel based on the updated delivery performance and the target model;

determining a threshold for the target resource cost based on the target resource cost; and submitting a data delivery request for delivering data on the target channel based on the threshold.

11. An electronic device, comprising a computer processor coupled to a computer-readable memory unit, the memory unit comprising instructions that when executed by the computer processor implements a method for managing data delivery across a plurality of channels, comprising:

obtaining delivery performance across the plurality of channels, the delivery performance having a value indicating a cost for the data delivery;

determining a plurality of resource costs for the data delivery across the plurality of channels based on the delivery performance and a plurality of predetermined models, the plurality of predetermined models being corresponding to the plurality of channels respectively, and with respect to a target channel in the plurality of channels, a target predetermined model in the plurality of predetermined models that corresponds to the target channel representing an association relationship between a resource cost for data delivery on the target channel and delivery performance of data delivery on the target channel, the target channel comprising each of the plurality of channels, the delivery performance of data delivery on the target channel being represented by the resource cost and a delivery purpose caused by the resource cost; and updating the delivery performance based on a sum of the plurality of resource costs and a resource cost constraint associated with the data delivery across the plurality of channels, the updated delivery performance being the same for the plurality of channels.

12. The electronic device according to claim 11, wherein determining the plurality of resource costs comprises: with respect to the target channel, determining a resource cost based on the delivery performance and the target model.

13. The electronic device according to claim 11, wherein obtaining the delivery performance comprises:

determining a performance range of the delivery performance for data delivery across the plurality of channels; and selecting the delivery performance within the performance range.

14. The electronic device according to claim 13, wherein updating the delivery performance comprises: in response to determining that the sum of the plurality of resource costs being above the resource cost constraint, adjusting the delivery performance within the performance range in a direction towards a lower threshold of the performance range.

15. The electronic device according to claim 13, the method further comprising:

determining a plurality of delivery purposes associated with the data delivery across the plurality of channels based on the plurality of predetermined models and the plurality of resource costs;

determining a total performance of the data delivery across the plurality of channels based on the sum of the plurality of resource costs and a sum of the plurality of delivery purposes; and adjusting the delivery performance within the performance range based on the total performance of the data delivery.

16. The electronic device according to claim 15, wherein adjusting the delivery performance within the performance range based on the total performance of the data delivery comprises at least any of:

in response to determining that the total performance of the data delivery being above a performance constraint, adjusting the delivery performance towards a lower threshold of the performance range; or in response to determining that the total performance of the data delivery being below a performance constraint and the sum of plurality of resource costs being below the resource cost constraint, adjusting the delivery performance towards an upper threshold of the performance range.

17. The electronic device according to claim 16, wherein:

adjusting the delivery performance towards the lower threshold of the performance range comprises: adjusting the delivery performance based on bisection of the delivery performance and the lower threshold; and adjusting the delivery performance towards the upper threshold of the performance range comprises: adjusting the delivery performance based on bisection of the delivery performance and the upper threshold.

18. The electronic device according to claim 11, wherein updating the delivery performance comprises: updating the delivery performance in response to determining that a difference between the delivery performance and the updated delivery performance does not meet a convergence condition.

19. The electronic device according to claim 11, the method further comprising: updating the resource cost by a target cost constraint corresponding to the target channel.

20. A non-transitory computer program product, the computer program product comprising a computer readable storage medium having program instructions embodied therewith, the program instructions executable by an electronic device to cause the electronic device to perform a method for managing data delivery across a plurality of channels, the method comprises:

obtaining delivery performance for data delivery across the plurality of channels, the delivery performance having a value indicating a cost for the data delivery;

determining a plurality of resource costs for the data delivery across the plurality of channels based on the delivery performance and a plurality of predetermined models, the plurality of predetermined models being corresponding to the plurality of channels respectively, and with respect to a target channel in the plurality of channels, a target predetermined model in the plurality of predetermined models that corresponds to the target channel representing an association relationship between a resource cost for data delivery on the target channel and delivery performance of data delivery on the target channel, the target channel comprising each of the plurality of channels, the delivery performance of data delivery on the target channel being represented by the resource cost and a delivery purpose caused by the resource cost; and updating the delivery performance based on a sum of the plurality of resource costs and a resource cost constraint associated with the data delivery across the plurality of channels, the updated delivery performance being the same for the plurality of channels.

* * * * *